(12) United States Patent
Wagner et al.

(10) Patent No.: US 11,639,841 B2
(45) Date of Patent: *May 2, 2023

(54) WEAPON DETECTOR WITH USER INTERFACE

(71) Applicant: Axon Enterprise, Inc., Scottsdale, AZ (US)

(72) Inventors: Daniel Joseph Wagner, Scottsdale, AZ (US); Nache D. Shekarri, Scottsdale, AZ (US); Jonathan R. Hatcher, Daytona Beach, FL (US); John W. Wilson, Phoenix, AZ (US); Andrew G. Terajewicz, Boston, MA (US); Lucas Kraft, Scottsdale, AZ (US); Brian Piquette, Seattle, WA (US); Zachary B. Williams, Seattle, WA (US); Elliot William Weber, Seattle, WA (US); Jason W. Haensly, Seattle, WA (US)

(73) Assignee: Axon Enterprise, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/746,891

(22) Filed: May 17, 2022

(65) Prior Publication Data

US 2022/0276022 A1 Sep. 1, 2022

Related U.S. Application Data

(63) Continuation of application No. 16/994,066, filed on Aug. 14, 2020, now Pat. No. 11,333,464, which is a
(Continued)

(51) Int. Cl.
*G08B 5/22* (2006.01)
*G08B 21/24* (2006.01)
(Continued)

(52) U.S. Cl.
CPC ............ *F41C 33/029* (2013.01); *F41C 33/04* (2013.01); *F41C 33/041* (2013.01); *G01D 5/145* (2013.01); *G08B 5/22* (2013.01); *G08B 21/24* (2013.01)

(58) Field of Classification Search
CPC ...... F41C 33/029; F41C 33/04; F41C 33/041; G01D 5/145; G08B 21/24; G08B 5/22
See application file for complete search history.

(56) References Cited

U.S. PATENT DOCUMENTS

| 5,479,149 A | 12/1995 | Pike |
| 9,879,944 B1 | 1/2018 | Gish |

(Continued)

OTHER PUBLICATIONS

United States Patent and Trademark Office, Notice of Allowance for U.S. Appl. No. 16/825,431 dated Mar. 10, 2022.
(Continued)

*Primary Examiner* — Omer S Khan
(74) *Attorney, Agent, or Firm* — Andrew Graham

(57) ABSTRACT

A detector for detecting the removal and/or insertion of a firearm out of and/or into a holster. The detector may transmit a message each time the firearm is removed from the holster. A recording system may receive the message and determine whether or not it will begin recording the data it captures. A detector may detect the change in a magnitude of an inductance and/or an impedance of a circuit to detect insertion and removal of the firearm into and out of the holster. The holster is configured to couple to the detector to position the detector to detect insertion and removal of the firearm. An adhesive tape may couple a detector to a holster.

20 Claims, 7 Drawing Sheets

Related U.S. Application Data continuation of application No. 16/218,086, filed on Dec. 12, 2018, now Pat. No. 10,775,131, which is a continuation of application No. 15/842,149, filed on Dec. 14, 2017, now Pat. No. 10,190,846.

(60) Provisional application No. 62/458,941, filed on Feb. 14, 2017.

(51) Int. Cl.
    *F41C 33/02*    (2006.01)
    *G01D 5/14*     (2006.01)
    *F41C 33/04*    (2006.01)

(56) References Cited

U.S. PATENT DOCUMENTS

| | | | |
|---|---|---|---|
| 9,958,228 B2 | 5/2018 | Stewart | |
| 2002/0161291 A1* | 10/2002 | Kianl | A61B 5/7275 600/324 |
| 2008/0061991 A1 | 3/2008 | Urban et al. | |
| 2013/0060115 A1 | 3/2013 | Gehman et al. | |
| 2014/0162584 A1 | 6/2014 | Cope | |
| 2015/0254968 A1 | 9/2015 | Sanders et al. | |
| 2015/0369559 A1 | 12/2015 | Del Rosario | |
| 2016/0086472 A1 | 3/2016 | Herrera et al. | |
| 2016/0286156 A1 | 9/2016 | Kovac | |
| 2016/0377373 A1 | 12/2016 | Feldstein | |
| 2017/0003101 A1 | 1/2017 | Madrid et al. | |
| 2017/0059274 A1* | 3/2017 | Crist | F41C 33/0263 |
| 2018/0100713 A1* | 4/2018 | Patches | G08B 25/004 |
| 2018/0135939 A1* | 5/2018 | Tedder | F41C 33/0209 |

OTHER PUBLICATIONS

European Patent Office, Communication pursuant to Article 94(3) EPC for European Application No. 17 896 972.1-1005 dated Mar. 3, 2022.
International Searching Authority, International Search Report for International Patent Application No. PCT/US2017/066394 dated Mar. 19, 2018.
USPTO, Notice of Allowance and Fees Due for U.S. Appl. No. 15/842,149 dated Sep. 19, 2018.
USPTO, Notice of Allowance and Fees Due for U.S. Appl. No. 16/218,086 dated May 5, 2020.
Australian Patent Office, Australian Examination Report for Australian Patent Application No. 2017399714 dated Apr. 7, 2020.
European Patent Office, Communication Pursuant to Article 94(3) EPC for European Patent Application No. H896972.1-1011 dated Jan. 15, 2021.
European Patent Office, European Search Report for European Application No. 17896972, dated Dec. 18, 2020, p. 1-4.

* cited by examiner

US 11,639,841 B2

WEAPON DETECTOR WITH USER INTERFACE

CROSS-REFERENCE TO RELATED APPLICATIONS

This application is a continuation of U.S. patent application Ser. No. 16/994,066, filed Aug. 14, 2020, which is a continuation of U.S. patent application Ser. No. 16/218,086, filed Dec. 12, 2018, now issued as U.S. Pat. No. 10,775,131, which is a continuation of U.S. patent application Ser. No. 15/842,149, filed Dec. 14, 2017, now issued as U.S. Pat. No. 10,190,846, which claims the benefit of U.S. Provisional Application No. 62/458,941, filed Feb. 14, 2017, each of which are incorporated by reference in their entirety.

FIELD OF THE INVENTION

Embodiments of the present invention relate to a detector that detects a weapon.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF THE INVENTION

Body cameras, vehicle cameras, wireless microphones and/or other recording systems are used by many security forces to record the events of an incident. Security forces include police departments, investigative and enforcement departments of a government (e.g., DOJ, FBI, CIA, ATF, CPB), and military forces. A recording, if properly handled, may serve as evidence in a subsequent proceeding. The operation of a recording system may be initiated manually or by a trigger. A trigger may include a signal sent to the recording system. A signal may be sent by a wired or wireless circuit. A signal sent wirelessly may include sending a message (e.g., information, data packet) using any conventional wireless communication protocol.

A trigger may be obligatory or permissive. A recording system (e.g., recording device, camera, microphone, video recorder) must initiate recording upon receipt of an obligatory trigger. A recording system that receives a permissive trigger is not required to initiate recording. A permissive trigger may include a message transmitted and/or received wirelessly that reports the status and/or the identity of the device sending the message. A recording system may initiate recording depending on the value of the status. A recording system may initiate recording depending on the value identity of the sending device. A recording system may decline to initiate recording from some values.

A situation for which it is desirable to initiate recording by recording systems is when a security officer draws a weapon (e.g., firearm). In many instances, personnel of security forces carry conventional firearms. In many instances, such firearms are carried bodily in a holster for transport and immediate access in case of need. Withdrawing a weapon from a holster may indicate that events of an incident are about to occur or that have just occurred should be recorded. A system for providing a notice, as discussed herein, may detect withdrawal of a weapon from a holster and provide a notice (e.g., trigger, message, permissive trigger, obligatory trigger) that the weapon has been withdrawn. A notice system may provide a notice in the form of a message transmitted wirelessly. Recording systems may receive the wireless notice. A recording system, depending on the type of notice (e.g., obligatory, permissive) may start recording.

A system for providing a notice may also provide a notice that the weapon has been inserted into the holster.

A system for providing a notice may provide a permissive trigger. A system for providing a notice may provide information that a recording system may use to determine whether or not to start recording. A recording system may use information provided by a system for providing a notice to perform other functions.

Information may include a unique identifier (e.g., alpha-numerical, serial number) of a detector, a state of operation of the detector, and/or an identity of the user of the system that provides the notice.

Figure 1:
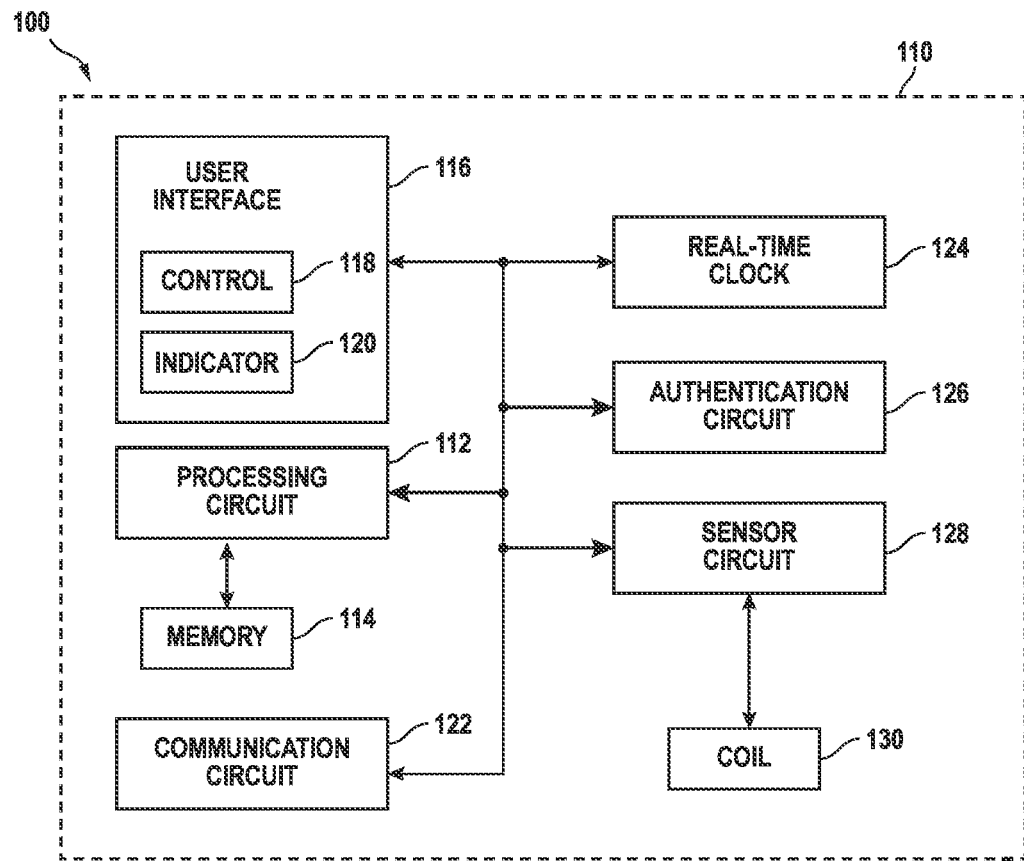
FIG. 1 is a block diagram of a system for providing a notice according to various aspects of the present disclosure.
Figure 1:
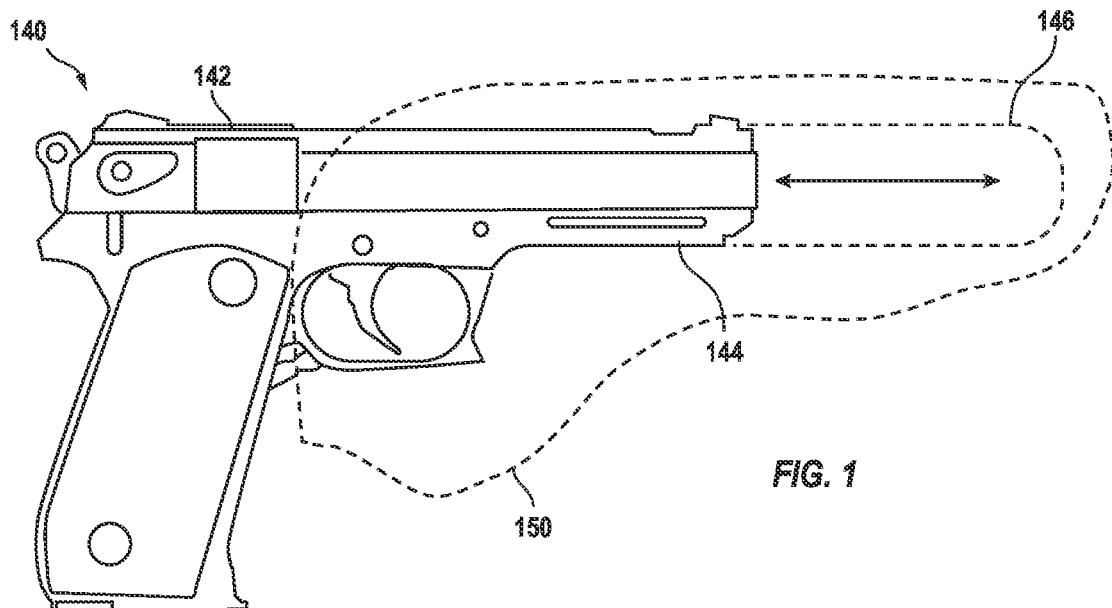

For example, system for providing a notice system 100 of FIG. 1 includes detector 110 and firearm system 140. Firearm system 140 includes firearm 142 and holster 150. Firearm 142 may include a conventional handheld firearm. Firearm 142 includes barrel 144. At least a portion of barrel 144 is formed of metal that is susceptible to detection using inductive sensing.

Detector 110 includes processing circuit 112, memory 114, user interface 116, communication circuit 122, real-time clock 124, authentication circuit 126, sensor circuit 128, and coil 130. User interface 116 includes control 118 and indicator 120. Detector 110 may further include NFC tag 860.

A detector detects whether a firearm is positioned in a holster. A detector detects whether a firearm is positioned out of (e.g., removed from) the holster. Depending on the implementation of the sensor circuit, the coil, and their sensitivity, a detector may detect the position of a firearm in a holster as opposed to solely whether the firearm is in or out of the holster.

A detector may wirelessly transmit a notice (e.g., message, data packet, data, signal, trigger) in response to detecting a change in the status of a firearm with respect to a holster. A change in status includes withdrawing of the firearm from the holster and inserting the firearm into the holster. The notice may include information to describe the detector transmitting the data, the user of the detector, the user of the firearm, the date and time of detecting, date and time of transmission of the notice, the status of the holster (e.g., firearm withdrawn, firearm inserted, firearm partially withdrawn, firearm partially inserted), previously transmitted dates and/or times, and/or previously transmitted status. The notice may further include information for authenticating the detector to one or more recording systems.

One or more recording systems may receive a notice from notice system 100. A recording system may use the information transmitted with the notice to determine whether or not (e.g., permissive trigger) to perform an operation (e.g., perform a function). An operation of a recording system may include starting (e.g., initiating) recording.

A detector may store information in a memory (e.g., a log). Information stored by a detector may include information related to the operation and/or status of the detector. Information stored by a detector may be stored as an entry in the log. Each entry in a log may include the date and time of recording the entry. Information stored in a log may include detecting withdraw of a weapon from a holster, detecting insertion of a weapon into a holster, activation (e.g., starting, operation of) a mute operation of the recorder, resetting of the detector, setting of the time of the circuit used to generate timestamps or to record actions in the log, executing a software (e.g., firmware) upgrade, updates to user settings, reverting to an earlier version of software, and/or detecting a system fault. The mute operation, discussed in more detail below, alters the information transmitted in one or more notices for a period of time.

A detector may receive information (e.g., data) such as information to upgrade the software of the detector. A detector may receive information from a user via a user interface. A detector may provide information to a user via the user interface.

A processing circuit includes any circuitry, component, and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic components (e.g., resistors, capacitors, inductors) and/or active electronic components (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may have a low power state in which only a portion of its circuits operate or it performs only certain functions. A processing circuit may be switched (e.g., awoken) from a low power state to a higher power state in which more or all of its circuits operate or it performs additional certain functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. A processing circuit may instruct a circuit or component to enter a low power state. A processing circuit may instruct a circuit or component to exit a low power state.

A memory stores information. A memory provides previously stored information. A memory may provide previously stored information responsive to a request for information. A memory may store information in any conventional format. A memory may store electronic digital information. A memory may provide stored data as digital information.

A memory includes any semiconductor, magnetic, or optical technology (e.g., device, chip, system), or a combination thereof for storing information. A memory may receive information from a processing circuit for storage. A processing circuit may provide a memory a request for previously stored information. Responsive to the request the memory may provide stored information to the processing circuit.

A memory may include any circuitry for storing program instructions and/or data. Storage may be organized in any conventional manner (e.g., program code, buffer, circular buffer, database). Memory may be incorporated in and/or accessible by a transmitter, a receiver, a transceiver, a sensor, a controller, and/or a processing circuit.

A communication circuit transmits and/or receives information (e.g., data). A communication circuit may transmit and/or receive (e.g., communicate) information via a wired and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA, LTE, BLE, EDGE, EV-DO) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., detector) may communicate with a communication circuit in another device (e.g., smart phone, tablet, mobile computer, server). Communications between two devices may permit the two devices to cooperate in performing a function of either device. For example, a user interface for a detector may be implemented on a smart phone that includes a touch screen. User interaction with the user interface on the smart phone is communicated to the detector via the communication circuits of the smart phone and detector. The detector performs the function indicated by the message from the smart phone. Any information produced by the detector for the user may be communicated from the detector to the smart phone via the communication circuits for presentation on the display of the smart phone.

A user interface enables a human user to interact with an electronic device (e.g., detector). A user may control, at least in part, an electronic device via the user interface. A user may provide information and/or commands to an electronic device via a user interface. A user may receive information (e.g., status) and/or responses from the electronic device via the user interface.

A user interface may include one or more controls that permit a user to interact and/or communicate with (e.g., provide information to) an electronic device to control (e.g., influence) the operation (e.g., functions) of the electronic device.

As discussed above, a user interface may provide information to a user. A user may receive visual, haptic (e.g., tactile, kinesthetic), and/or audible information from a user interface. A user may receive visual information via devices (e.g., indicators) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed.

A user interface may include a communication circuit for transmitting information to an electronic device for presentation to a user, as discussed above.

A control includes any electromechanical device suitable for manual manipulation by a user. A control includes any electromechanical device for operation by a user to establish or break an electrical circuit. A control may include a portion of a touch screen. Operation of a control may occur by the selection of a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, a reed switch, and a key lock switch (e.g., switch lock).

A control may be operated in different manners by a user to provide different information to a detector. For example, in an implementation in which the control is implemented as a push button, a user may press and release the button; press, hold the button for a period of time, then release the button during which the period of time for which the button is held determines whether the press is a long press or a very long press; press the button, release, press again, release (e.g., double press).

The term "control", in the singular, represents a single electromechanical device for operation by a user to provide information to a device. The term "controls", in plural, represents a plurality of electromechanical devices for operation by a user to provide information to a device. The term "controls" include at least a first control and a second control.

A processing circuit may detect the operation of a control. A processing circuit may perform a function responsive to operation of a control. Responsive to a control, a processor may perform a function, halt a function, resume a function, or suspend a function of the electronic device of which the control and the processor are a part. A control may provide analog or binary information to a processor.

The function performed by an electronic device responsive to operation of a control may depend on the current operating state (e.g., present state of operation, present function being performed) of the electronic device of which the control is a part.

A user may receive information from an electronic device via an indicator. An indicator may provide information visually, via haptic feedback, and/or audibly as discussed above. In an implementation in which the indicator is implemented as an LED, the indicator may convey information by turning the LED on and off (e.g., blink) or vice versa, the color of light provided by the LED, the rate of turning the LED on and off, the duration of time the LED is on or off, and/or the sequence of colors provided by the LED.

A real-time clock tracks (e.g., follows, keeps track of) the current (e.g., present) time. The functions of a real-time clock may be performed by a processing circuit. A dedicated circuit may perform the functions of a real-time clock. A real-time clock may be highly accurate (e.g., 5 seconds-12 minutes lost or gained per year). A real-time clock may further track day, date, and year. A real-time clock may provide the present time to a processing circuit. A real-time clock may track time even when other circuits are powered down. A processing circuit may perform some or all of the functions performed by a real-time clock.

Authentication is the act of verifying a claim of identity. Authentication may be used to confirm a user's identity. For example, a bank may authenticate the identity of a person requesting a withdrawal by asking for and inspecting photo ID. Computers may confirm the identity of a user by the user providing a user name and password. One electronic device may be authenticated to another electronic device. Authentication may also be accomplished by a challenge-response protocol in which one party, or electronic device, issues a challenge and the person, or electronic device, must provide a valid answer to be authenticated.

Cryptographic techniques may be used to confirm the identity of a user. For example, Public Key Infrastructure permits authentication using public and private keys. One device has a private key and issues a public key. When the device requests communication with another device, such as a computer, the computer generates and sends a random number to the user. The user encrypts the random number using its private key. The device sends the encrypted number back to the computer. The computer uses the device's public key to decrypt the encrypted number. If the decrypted number matches the originally sent random number, then the identity of the user has been authenticated to the computer.

An authentication circuit may be used to authenticate a user and/or an electronic device. An authentication circuit may store keys, generate random numbers, generate guaranteed unique numbers, encrypt, and decrypt. An authentication circuit may perform public key (e.g., PKI) algorithms such as high-speed PKI algorithms and elliptical curve algorithms (e.g., P256, B283, K283). An authentication circuit may perform digital signature algorithms such as Digital Signature Algorithm (e.g., FIPS 186, 186-1, 186-2, 186-3, 186-4) and elliptical curve digital signature algorithms (e.g., FIPA 186-3).

An authentication circuit may cooperate with a processing circuit, a user interface, and/or a communication circuit to authenticate a user and/or a device.

A sensor circuit detects (e.g., measures, witnesses, discovers, determines) a physical property (e.g., intensive, extensive, isotropic, anisotropic). A physical property may include momentum, capacitance, electric charge, electric impedance, electric reactance, inductance, electric potential (e.g., electromotive force), frequency, luminance, luminescence, magnetic field, magnetic flux, mass, electromagnetic field, pressure, spin, stiffness, temperature, tension, velocity, sound, heat, and time. A sensor circuit may detect a quantity, a magnitude, and/or a change in a physical property. A sensor circuit may detect a physical property and/or a change in a physical property directly and/or indirectly. A sensor circuit may detect a physical property and/or a change in a physical property of an object.

A sensor circuit may detect a physical quantity (e.g., extensive, intensive). A physical quantity may be positive, negative, or zero. A sensor circuit may detect a change in a physical quantity directly and/or indirectly. A sensor circuit may detect one or more physical properties and/or physical quantities at the same time (e.g., in parallel), at least partially at the same time, or serially. A sensor circuit may deduce (e.g., infer, determine, calculate) information related to a physical property. A physical quantity may a magnitude of any of the physical properties discussed above. For example, a physical quantity may include an amount of time, an elapse of time, a magnitude of an electric current, an amount of electrical charge, a magnitude of a current density, a magnitude of a voltage, an amount of capacitance, an amount of inductance, a magnitude of impedance, a magnitude of reactance, a magnitude of a magnetic field, and a flux density.

A sensor circuit may provide force to detect a physical property and/or a physical quantity. A force may include an electromotive force (e.g., voltage, current). A force may be provided before, coincident with, and/or after detecting. A force may be provided once, periodically, repeatedly, and/or as needed. An electromotive force may include a direct current ("DC") or an alternating current ("AC"). For example, a sensor circuit may provide a voltage to detect a capacitance. A sensor circuit may provide a current to generate an electromagnetic field and/or to detect a change in an electromagnetic field. A sensor circuit may provide a current to an LC circuit (e.g., LC tank circuit) to cause the LC circuit to oscillate. Providing a force may include providing a current to a coil to produce an electromagnetic field.

A sensor circuit may include and/or cooperate with a processing circuit for detecting, transforming, relating, and deducing physical properties and/or physical quantities. A processing circuit that is part of or cooperates with a sensor circuit may include any conventional circuit for detecting, transforming, relating, and deducing physical properties and/or physical quantities. For example, a processing circuit may include a voltage sensor, a current sensor, a charge sensor, an electromagnetic sensor, and/or a frequency sensor.

A sensor circuit may provide information. A sensor circuit may provide information regarding a physical property and/or a change in a physical property. A sensor circuit may provide information regarding a physical quantity and/or a change in a physical quantity. A sensor circuit may provide information regarding information determined using a processing circuit.

For example, a sensor may drive an LC circuit, a frequency counter may measure the frequency of the oscillation of the LC circuit, the measured frequency may be compared to a reference frequency (e.g., clock), the current drawn by the LC circuit may be measured and from the measured frequency and current the parallel resistance of the LC circuit may be deduced. The magnitude of the parallel resistance may be used to determine whether the LC circuit operates in the presence or absence of a weapon in a holster.

In another example, a sensor may be implemented using an inductance-to-digital converter ("LDC"), such as the LDC1101 from Texas Instruments. An LDC performs the functions of a sensor circuit. The LDC couples to a coil, provides an alternating current to the coil to generate an electromagnetic field through the coil, measures the inductance and/or equivalent parallel impedance of the circuit that includes the coil, converts the measure inductance and/or impedance to a digital number and reports the number. The LDC may also detect a change in the measured inductance and/or impedance. A processing circuit may receive the digital numbers reported by an LDC. An LDC may provide a current to an LC tank circuit, measure the frequency of the oscillations of the LC tank circuit, and deduce the inductance of the LC tank circuit, and report the inductance of the LC tank circuit.

An LDC may provide current to an LC tank circuit, measure the electrical current or power consumed by the LC tank circuit, and deduce the electrical resistance or impedance of the LC tank circuit, and report the resistance or impedance of the LC tank circuit.

Because metal (e.g., barrel of a gun) alters (e.g., changes, interacts with) with the electromagnetic field generated by the LDC via the coil, the LDC, in cooperation with processing circuit 112, may detect the presence and/or absence of metal. The LDC may measure the inductance of the circuit that includes the coil in the absence of metal, measure the inductance in the presence of metal, and report the values to processing circuit 112. Information from a user via user interface 116 may include whether the firearm was in the holster or not for each measurement made by the LDC.

Further, because metal (e.g., barrel of a gun) alters the value of the inductance in an LC tank circuit and thereby the resonant frequency of the LC tank circuit, an LDC coupled to the LC tank circuit may detect the presence and/or absence of metal.

The LDC may measure the resonant frequency of an LC tank circuit that includes the coil in the absence of metal and the presence of metal and reports the values to processing circuit 112. Processing circuit 112 may receive information from the user via user interface 116 to associate the information provided by the LDC with whether the gun was in the holster or not. Processing circuit 112 may determine whether the gun is in the holster using prior values reported by the LDC and the current values reported by the sensor circuit 128.

A coil is a conductor shaped to form a closed geometric path. A closed geometric path is not a closed conducting path unless the two ends of the coil are electrically coupled together. Coils may have multiple turns. A coil may be wrapped around an iron core or an insulating form, or it may be self-supporting. A coil may be formed in a plane of a printed circuit board. A coil may be formed in one or more planes (e.g., layers) of a printed circuit board.

Providing an AC signal to a coil causes the coil to generate an electromagnetic field. Metal may interact (e.g., interfere) with the electromagnetic field generated by a coil, as discussed above. Interaction of the magnetic field of a coil with metal alters the measured inductance of the coil. A sensor circuit may provide an AC signal to a coil to cause the coil to generate an electromagnetic field. A sensor circuit may detect the interaction of metal with the electromagnetic field. A sensor circuit and coil may detect a proximity of metal by detecting the presence or absence of interaction with the electromagnetic field by metal. Detecting interaction with the electromagnetic field may be referred to as inductive sensing.

For example, coil 200 is formed of conductor 220 on one or more layers of printed circuit board ("PCB") 210. The two end portions of conductor 220, end portion 250 and end portion 350 are available to couple to a sensor circuit. A forward portion of coil 200, the portion facing outward in FIG. 2 and upward in FIG. 3, is for positioning toward a holster for detecting the presence or absence of the metal of a firearm in the holster.

Figure 2:
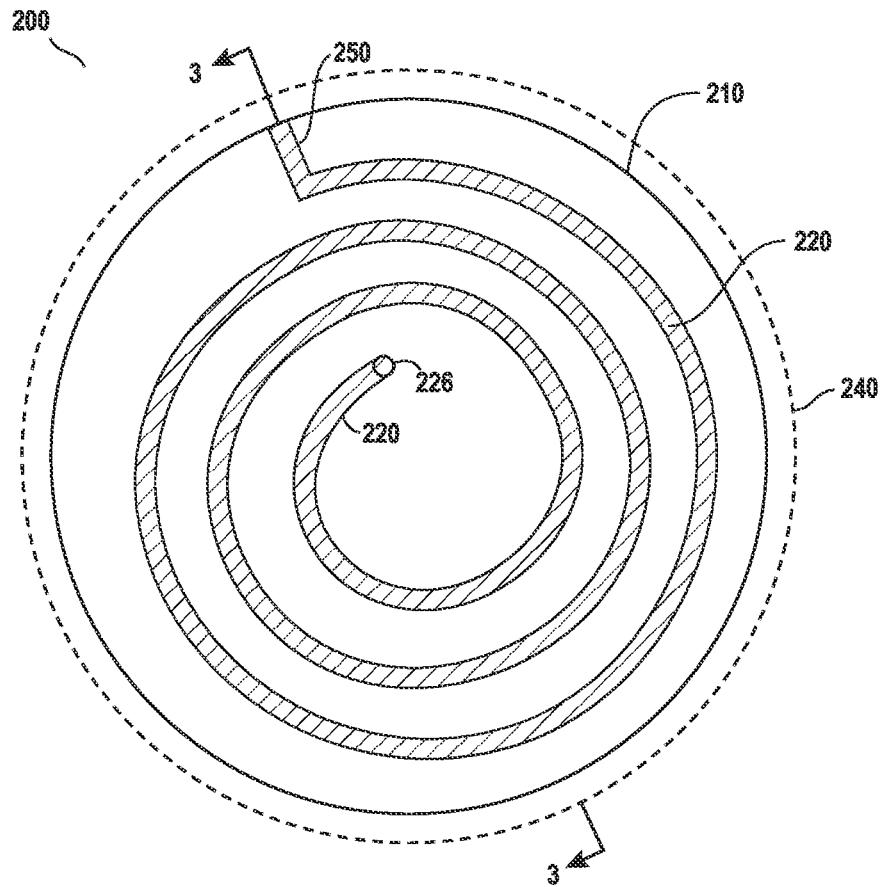
FIG. 2 is a diagram of an implementation of the coil of FIG. 1.
Figure 3:
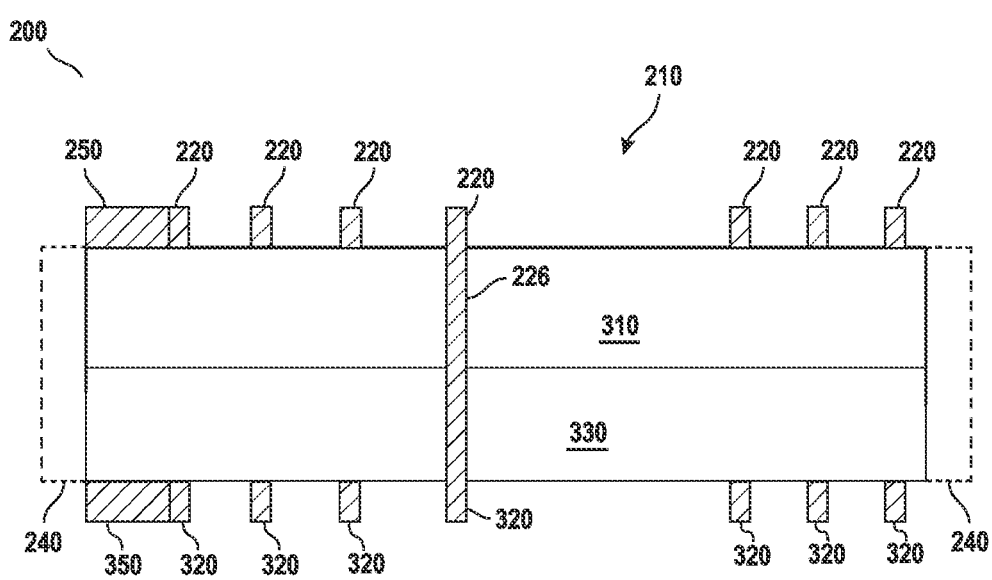
FIG. 3 is a cross-section view of the coil of FIG. 2 along 3-3.

Coil 200 may include shield 240, around conductor 220 in FIG. 2 and to the right and left sides in FIG. 3. Shield 240 shields conductor 220 from electromagnetic noise and interaction with metal placed to the side of coil 200 rather than the forward portion of coil 200. For example, shield 240 shields coil 200 from interaction with the metal of a vehicle door when a user leans against the door while wearing a holster equipped with detector 110. Shield 240 may also set (e.g., limit, focus, direct, point) the direction of the electromagnetic field generated by coil 200 and thereby the direction of sensing by coil 200. In an implementation, shield 240 limits coil 200 to detecting metal forward (e.g., outward with respect to FIG. 2, and upward with respect to FIG. 3) of conductor 220.

A shield may further extend to behind coil 200 (e.g., behind in FIG. 2, below in FIG. 3) (not shown) to provide shielding to a rear portion of coil 200.

A shield may be coupled to an electric potential (e.g., ground, any voltage). A shield may be uncoupled to an electric potential (e.g., floating).

In an implementation, coil 200 includes conductor 220 formed on a first layer of PCB 210 and conductor 320 formed on a second layer of PCB 210. Conductors 220 and 320 are formed of metal (e.g., copper, aluminum, alloy). Conductor 220 is deposited on (e.g., in) layer 310 of PCB 210. Conductor 320 is deposited on (e.g., in) layer 330 of PCB 210. Conductor 320 may include the same electrical (e.g., impedance, inductance) and physical (e.g., number of turns, shape, position with respect to PCB 210 and/or conductor 220) characteristics as conductor 220. Conductor 220 may couple serially to conductor 320.

In the implementation of FIGS. 2 and 3, conductor 220 is positioned on first layer 310 of PCB 210. End portion 250 of conductor 220 extends to an edge of PCB 210 for electrical coupling. Conductor 320 is positioned on layer 330 of PCB 210. Conductor 320 has the same number of turns and shape as conductor 220. An end portion of conductor 220 couples to an end portion of conductor 320 via conductor 226 so that conductor 220 serially couples to conductor 320. Because conductor 220 serially couples to conductor 320, a current flowing into end portion 250 of conductor 220 flows out of end portion 350 of conductor 320. Applying a voltage between end portion 250 and end portion 350 applies a voltage across conductor 220 and conductor 320.

In another implementation, coil 200 includes only conductor 220 implemented on layer 310 of PCB 210.

Shield 240 may be integral with PCB 210. Shield 240 may be separate from PCB 210. PCB 210 may be placed inside shield 240. Shield 240 may be placed around all or a portion of PCB 210. A shield may be formed of a metal such as aluminum, nickel, or copper.

Figure 4:
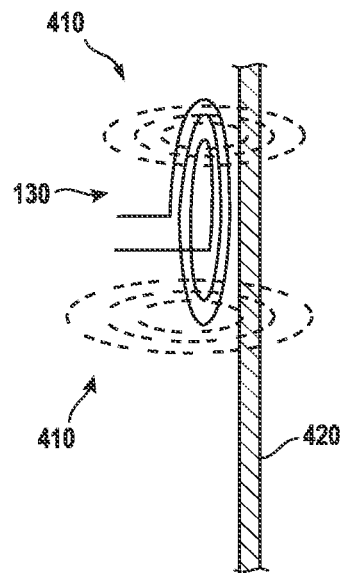
FIG. 4 is a diagram of an electromagnetic field from the coil of FIG. 1 or FIG. 2 in the absence of a weapon.

When coil 130 is excited (e.g., driven, powered) with a signal (e.g., AC, impulse) from the sensor circuit 128, coil 130 generates electromagnetic field 410 that extends from coil 130. Coil 130 may be position proximate to wall 420 of a holster so that electromagnetic field 410 extends through wall 420 into the cavity of the holster where the firearm is positioned when the firearm is in the holster. In the absence of the firearm, shown in FIG. 4, nothing interacts with electromagnetic field 410. Sensor circuit 128 may measure the inductance of coil 130 in the absence of the firearm from the holster.

Figure 5:
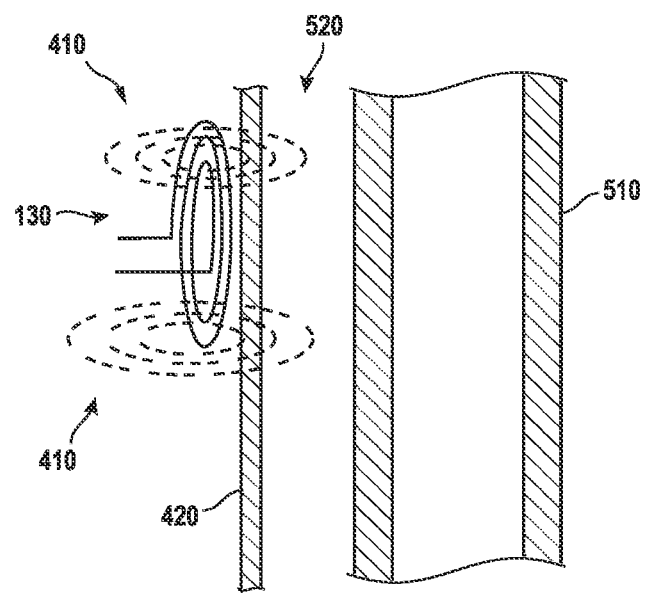
FIG. 5 is a diagram of the electromagnetic field from the coil of FIG. 1 or FIG. 2 in the presence of a weapon.
Figure 9:
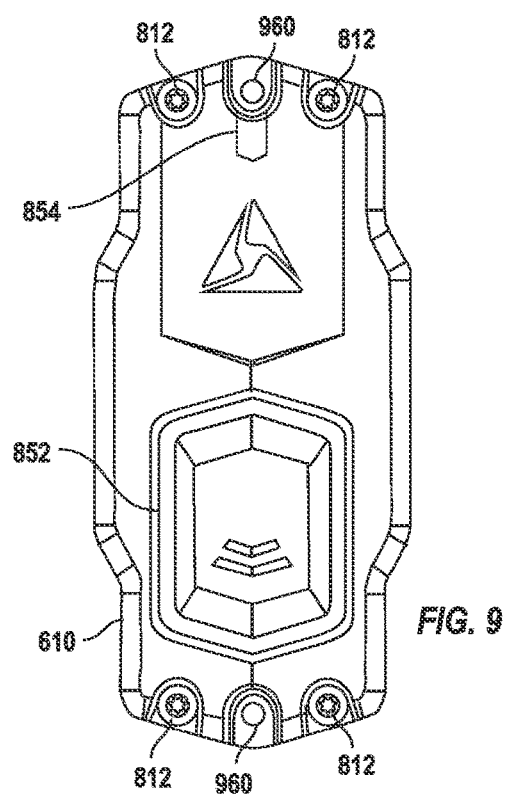
FIG. 9 is a front view of the implementation of the detector of FIGS. 6-8.

When the firearm is inserted into the holster, referring to FIG. 5, metal from the firearm, in this case, barrel 510, interacts with electromagnetic field 410 thereby changing the perceived (e.g., measured) inductance of coil 130. Sensor circuit 128 can sense the difference in the inductance when the firearm is present in the holster. In accordance with the difference, change, and/or magnitude of the inductance, sensor circuit 128 may deduce (e.g., detect, sense, measure) and report the presence of the firearm in the holster. Sensor circuit 128 may further detect the magnitude of the inductance of the circuit, as discussed above, when the firearm is not present in the holster and report the absence of the gun from the holster.

In another implementation, coil 130/200 may couple to a capacitor (not shown) to form an LC tank circuit. The signal provided by sensor circuit 128 causes the LC tank circuit to resonate (e.g., oscillate). Sensor circuit 128 may measure the frequency of resonation to determine whether the firearm is positioned in the holster. Sensor circuit 128 and/or processing circuit 112 may use the measured frequency of oscillation to determine the inductance of coil 130/200.

The frequency of oscillation of the LC tank circuit is governed by the formula $f=1/(2\pi*\sqrt{(LC)})$. The value of the capacitance, C, is known and fixed, so the frequency of oscillation of the LC tank circuit is determined by the value of the inductance of coil 130. While firearm 142 is absent from holster 150/650, the impedance of the LC tank circuit, L, is a first value L1. See FIG. 4. While the inductance of the LC tank circuit is L1, the tank circuit oscillates at a first frequency f1. While firearm 142 is positioned in holster 150/650, see FIG. 5, the metal of firearm 142 interacts with the electromagnetic field from coil 130/200 and thereby alters the value of the inductance of the LC tank circuit. While firearm 142 is inserted in to holster 650 and proximate to coil 130/200 the inductance of the LC tank circuit is a second value L2. While the inductance of the LC tank circuit is L2, the tank circuit oscillates at a second frequency f2.

Detector 110/610 may detect a difference (e.g., |f1−f2|, f1−f2, f2−f1) in frequency and/or a difference in parallel resistance of the LC tank circuit to determine whether firearm 142 is present in holster 150/650. Or, detector 110/610 may use the measured frequency and/or resistance of the LC tank circuit (e.g., f1, f2) and the known value of the capacitance of the LC tank circuit to determine the measured inductance (e.g., L1, L2) and whether firearm 142 is in or out of holster 150/650.

A firearm (e.g., gun) is a weapon that launches a projectile (e.g., bullet, shell) to deliver a force of impact to an object via the projectile. Conventional firearms include pistols (e.g., handguns) and rifles (e.g., long arms, shotguns, carbines) whether single shot, semiautomatic, or fully automatic. Many conventional firearms use combustion of a pyrotechnic to launch the projectile.

Figure 6:
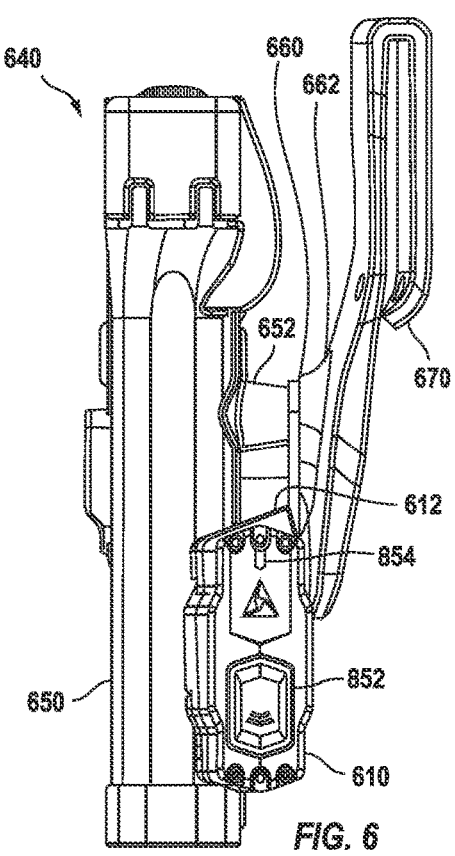
FIG. 6 is a view of an implementation of the system for providing a notice of FIG. 1 with a first implementation for mounting the detector proximate to the holster.
Figure 7:
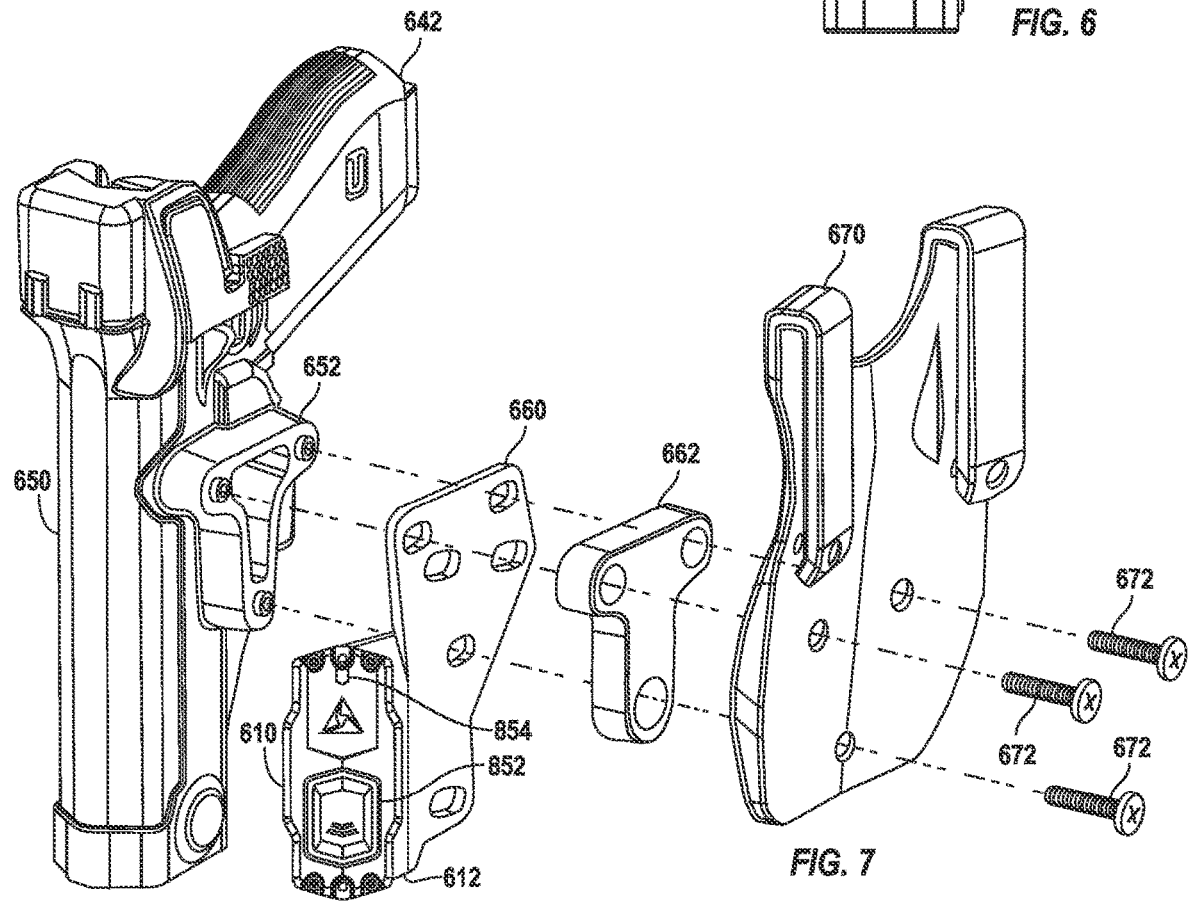
FIG. 7 is an exploded view of the implementation of the system for providing a notice of FIG. 6.
Figure 8:
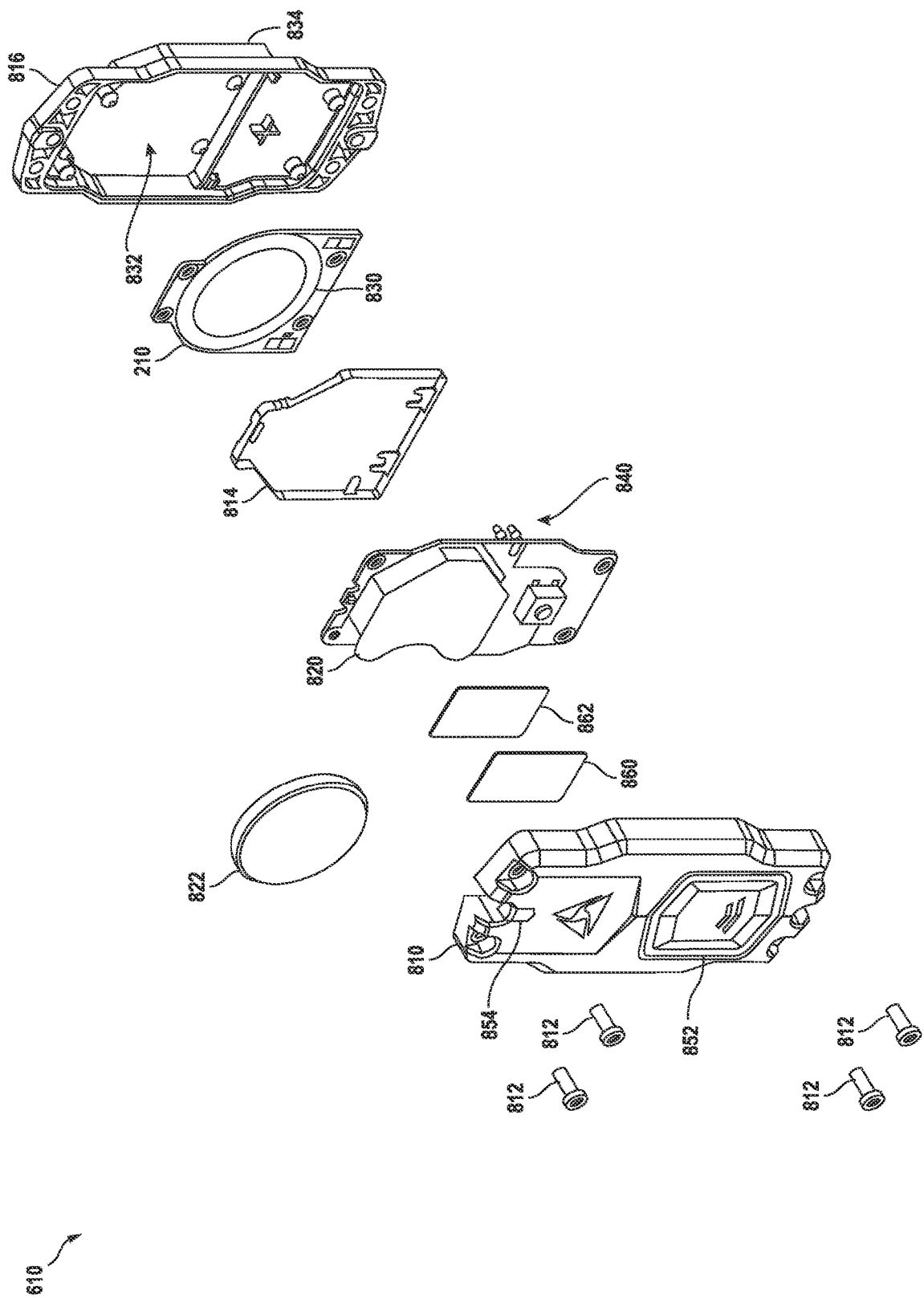
FIG. 8 is an exploded view of the implementation of detector of FIGS. 6 and 7.
Figure 10:
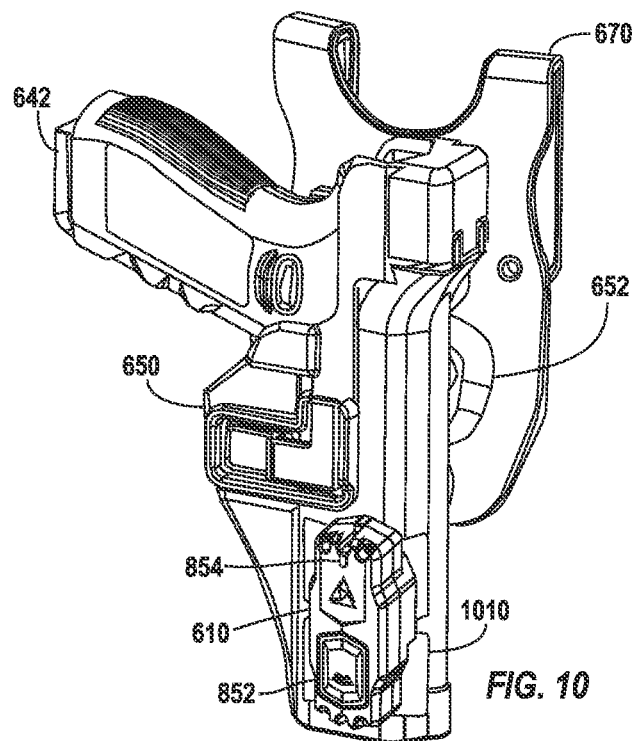
FIG. 10 is a view of an implementation of the system for providing a notice of FIG. 1 with a second implementation for mounting the detector proximate to the holster.
Figure 11:
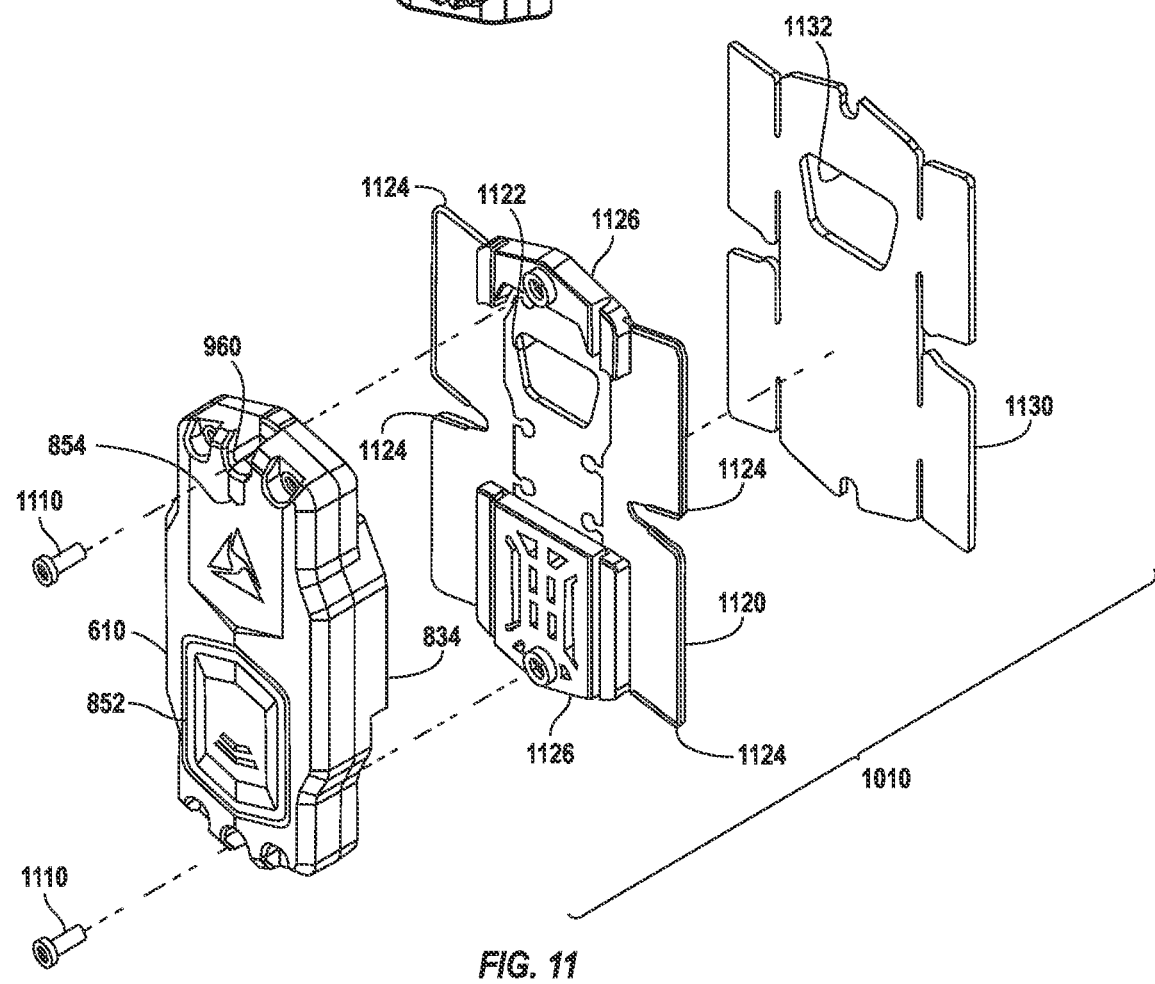
FIG. 11 is an exploded view of the second implementation for mounting the detector of FIG. 10.
Figure 12:
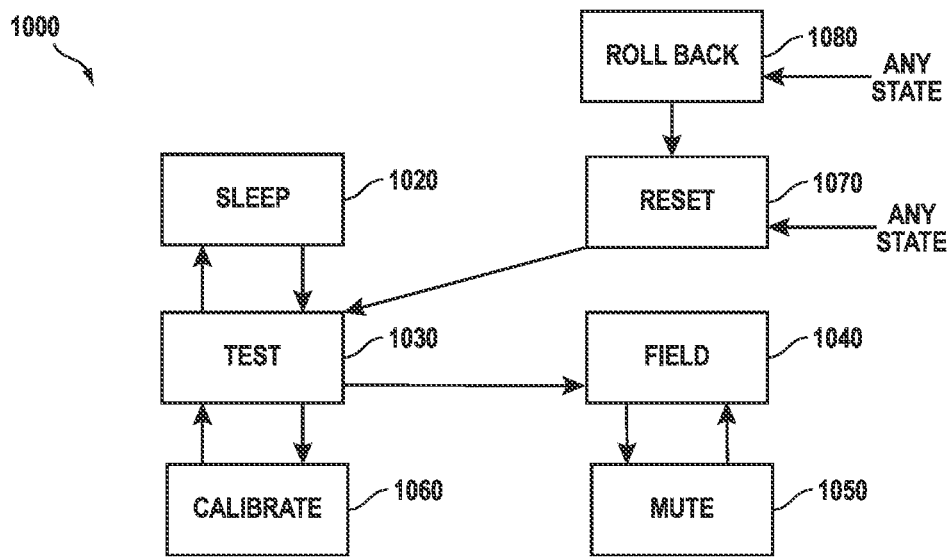
FIG. 12 is a state diagram of the operating modes of the detectors of FIGS. 1 and 6-11.
Figure 13:
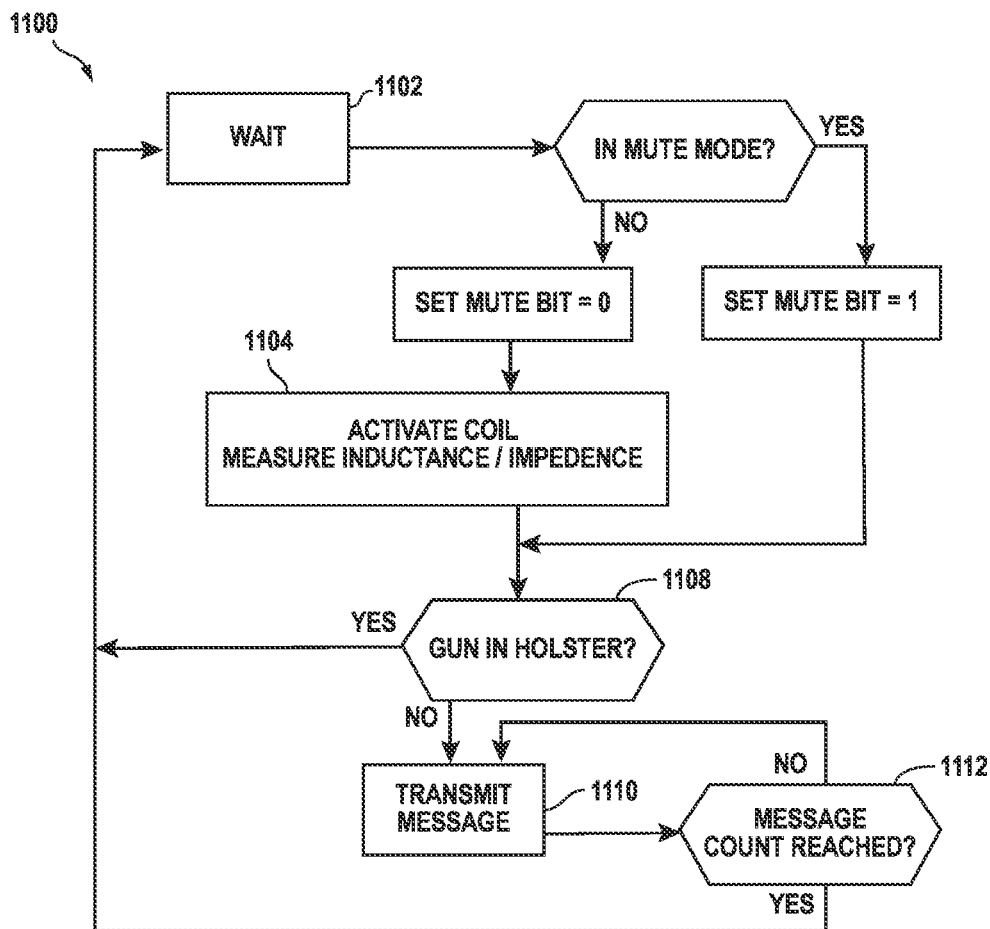
FIG. 13 is a state diagram of a method for monitoring the presence or absence of a firearm.

Most conventional firearms are formed, at least partially, of metal. Most conventional firearms include at least a metal barrel. For example, firearm 642, shown in FIGS. 6-7 and 10, is a conventional firearm with a metal barrel. The metal of a firearm may interact with the electromagnetic field generated by a coil. A sensor circuit may detect the change in the electromagnetic field that results when the metal of a firearm is proximate to the coil that is generating an electromagnetic field.

A holster is a case (e.g., holder) that holds a firearm. Conventional holsters for handguns have an opening to facilitate quick removal and insertion of the handgun out of and into the holster respectively. The shape of the holster generally conforms to the shape of the firearm (e.g., barrel, finger guard). A holster may be formed of any material. Common materials include leather and plastics. The material of many holsters, such as those formed of leather or plastics, permit the passage of an electromagnetic field through the walls of the holster so that a sensor circuit may detect the presence or absence of a metal portion of a firearm inside the holster.

For example, holster 650 of firearm system 640, shown in FIGS. 6-7 and 10, is suitable for accepting and holding firearm 642 and for mounting holster system 600 to a user's belt. Firearm system 640 includes holster 650 and belt mount 670. Holster 650 includes mount 652 for mounting to belt mount 670 to couple holster 650 to belt mount 670. As discussed in further detail below, holster 650 may be decoupled from belt mount 670. Plate 660 and spacer 662 may be positioned between mount 652 and belt mount 670. Mount 652 may be coupled to plate 660 so that plate 660 and spacer 662 are positioned and retained between mount 652 and belt mount 670.

In other implementations, belt mount 670 may be replaced with a thigh mount, a MOLLE mount, and a quick-detach mount.

Mount 652 and belt mount 670 may have structures (e.g., holes) that correspond to each other to facilitate mounting belt mount 670 to mount 652 with retaining plate 660 and spacer 662 positioned in between.

While belt mount 670 is coupled to holster 650, holster 650 and belt mount 670 function as a single unit to hold firearm 642 and to mount to a user's belt. While mounted to the user's belt, firearm 642 may be withdrawn and inserted into holster 650.

While plate 660 and spacer are mounted between mount 652 and belt mount 670, holster 650, mount 652, plate 660, spacer 662, and belt mount 670 function as a single unit to hold firearm 642 and to mount to a user's belt. Firearm 642 may be withdrawn and inserted into holster 650 while these components are coupled to each other. Plate 660 and/or spacer 662 do not interfere with removing and/or inserting firearm 642 out of or into holster 650.

Plate 660 includes positioner 612. Detector 610 may mount to positioner 612. Positioner 612 positions and holds (e.g., maintains) detector 610 proximate to holster 650, so that the electromagnetic field from detector 610 passes through the wall of holster 650 to determine, via measuring inductance, impedance, and/or frequency, whether firearm 642 is inserted into holster 650 or withdrawn from holster 650.

In another implementation, very high bond ("VHB") mount 1010 positions detector 610 with respect to holster 650 so that the electromagnetic field from detector 610 passes through the wall of holster 650 to determine, via measuring inductance, impedance, and/or frequency, whether firearm 642 is inserted into holster 650 or withdrawn from holster 650.

VHB mount 1010 includes mount 1120 and VHB tape 1130. Detector 610 mechanically mounts to mount 1120. Mount 1120 includes flexible tabs 1124. Tabs 1124 may flex to conform to the exterior surface of holster 650. Base 1126 is formed of a rigid material to maintain detector 610 positioned with respect to mount 1120 and opening 1122. VHB tape 1130 is a very high bond tape that provides a strong adhering force between mount 1120 and holster 650. The shape of VHB tape 1130 is similar to the shape of mount 1120 including tabs 1124. VHB tape 1130 includes opening 1132 that substantially aligns with opening 1122 when VHB tape 1130 adheres to mount 1120 and holster 650. Opening 1122 and 1132 may reduce interference with the electromagnetic field that issues from coil wall 834 to detect the presence or absence of firearm 642 in holster 650. Opening 1122 and 1132 may further operate as a window to permit the serial number of detector 610 to be viewed prior to mounting.

After mount 1120 and VHB tape 1130 are coupled to holster 650, detector 610 may be decoupled from mount 1120 to be service or replaced. Mount 1120 and VHB tape 1130 remain coupled to the exterior of holster 650. With effort, mount 1120 and VHB tape may be decoupled from holster 650.

Processing circuit 112, memory 114, user interface 116, communication circuit 122, real-time clock 124, authentication circuit 126, sensor circuit 128, coil 130, control 118, indicator 120, firearm system 140, and holster 150 may perform the functions and include the structures of a processing circuit, a memory, a user interface, a communication circuit, a real-time clock, an authentication circuit, a sensor circuit, a coil, a control, an indicator, a firearm system, a firearm, and a holster respectively as discussed above.

In operation, processing circuit 112 controls, performs, or directs most or all of the operations of detector 110. Processing circuit executes a program stored in memory 114 to perform or control the functions of detector 110. In an implementation, memory 114 is implemented as a flash memory. Processing circuit 112 responsive to the program enters various states of operation (e.g., modes) to perform particular functions. Processing circuit 112 may perform method 1000 and/or 1100 in whole or part as discussed below. In each mode, processing circuit 112 performs or controls the performance of specific operations. The modes and the operations performed in the various modes are discussed below.

Processing circuit 112 receives information for a user via user interface 116. In particular, as the user operates or controls control 118, control 118 sends signals to processing circuit 112. Responsive to the signals, processing circuit 112 performs functions, controls the performance of a function, and/or changes from one mode to another mode. In an implementation, control 118 is a switch (e.g., electromechanical) that is manually operated by a user.

Processing circuit 112 also provides information to the user responsive to the operation and/or modes of detector 110. Processing circuit 112 provides signals to indicator 120 responsive to performance of an operation, entering a state of operation, exiting a state of operation, and/or occurrence of a change in a state of operation. In an implementation, indicator 120 is an LED. Processing circuit 112 may provide a signal that turns the LED on and off to provide information to the user. Processing circuit 112 may turn the LED on and off at a frequency of operation or in accordance with a pattern to provide information to the user and/or to indicate a state of operation of detector 110. A pattern and/or color of light provided by the LED may indicate particular information to a user.

In another implementation, indicator 120 includes or exclusively provides an audible sound or tactile feedback to provide the user information. Processing circuit 112 may control a sound producing indicator (e.g., buzzer) or tactile producing indicator (e.g., vibrator) in the same manner as the LED including providing sound or vibrations in accordance with patterns.

Sensor circuit 128 cooperates with coil 130 to detect the presence or absence of firearm 142 in holster 150. Sensor circuit 128 may drive coil 130 with a signal (e.g., AC, DC, impulse), as discussed above, so that coil 130 generates an electromagnetic field. Sensor circuit 128 detects (e.g., senses, measures) the inductance, impedance, and/or frequency of oscillation of the circuit that includes coil 130. When metal from firearm 142 is not proximate to coil 130, sensor circuit 128 detects a first magnitude of inductance, impedance, and/or frequency. When metal from firearm 142 is proximate to coil 130, sensor circuit 128 detects a second magnitude of inductance, impedance, and/or frequency. Sensor circuit 128 may report the values (e.g., absolute, actual) of the first magnitude and the second magnitude and/or a change in the magnitude.

Processing circuit 112 may receive reports from sensor circuit 128. Processing circuit 112 may use the information that is detected by sensor circuit 128 to determine whether firearm 142 is in holster 150 or whether holster 150 has been withdrawn from holster 150.

Responsive to determining that firearm 142 had been withdrawn from holster 150, processing circuit 112 may instruct communication circuit 122 to transmit a message. A message transmitted by communication circuit 122 may include information such as an identifier (e.g., serial number) of detector 110 and/or an identity of the user, as discussed above. An identifier of detector 110 may be unique. The message may further include the status of firearm 142 with respect to holster 150 (e.g., withdrawn, inserted), a cryptographic signature, a time-stamp, a state of the battery (e.g., power level) of detector 110, the mode of detector 110 (e.g., test, calibrate, field, mute), the serial number of firearm 142, and/or the version of the software of detector 110. In an implementation, the message transmitted by communication circuit 122 includes all or some of the above information.

The message transmitted by communication circuit 122 may be received by any electronic device capable of receiving messages that is in communication with communication circuit 122. The message may be transmitted wirelessly. The electronic device receiving the message may analyze the information provided in the message. Responsive to the content of the information in the message, an electronic device may perform an operation.

In an embodiment, body cameras, vehicle cameras, wireless microphones and/or other recording systems may receive a message from detector 110. Responsive to determining that the message reports that a weapon has been withdrawn from a holster, the recording system may (e.g., permissive trigger) start capturing and/or recording information. A recording system may use other information from a message to determine whether or not to start recording. For example, if the information in the message shows that detector 110 is in the mute mode (e.g., mute bit set to 1), discussed below, the recording system may decide to not start recording. If the identifier of detector 110 or the user of detector 110 does not match a list of permitted detectors or users, the recording system may elect to not begin recording.

Communication circuit 122 may transmit a message upon detecting that firearm 142 has been placed into holster 150. A recording system may elect (e.g., permissive trigger) to stop recording upon receiving such information. A recording device may elect to continue recording even though firearm 142 has been returned to the holster so that the user must manually terminate recording.

Communication circuit 122 may also receive information. For example, communication circuit 122 may receive data for updating the software of detector 110. Communication circuit 122 may receive information as to the identity of the user of detector 110 (e.g., holster 150, firearm 142). Communication circuit 122 may receive information as to the serial number of firearm 142.

Real-time clock 124 may provide time, day, and/or date information. Information from real-time clock 124 may be included in a message transmitted by communication circuit 122. Real-time clock 124 may also provide time information for logging information as discussed above. The present time of real-time clock 124 may be changed. Communication circuit 122 may receive a new time and the present time of real-time clock 124 may be set to the new time. Setting real-time clock 124 to a new time may be performed during manufacture, to synchronize the time maintained by two or more detectors 110, or to correct an error in the time maintained by real-time clock 124. Real-time clock 124 may track time as universal time coordinated ("UTC"), yet report time in a local format (e.g., UTC-7 for Arizona). Time reported by real-time clock 124 may account for local time zone and/or daylight savings time. Real-time clock 124 may also report time in UTC format and a receiving device may make any adjustments to determine local time. Processing circuit 112 may perform some or all of the functions of real-time clock 124.

The time maintained by real-time clock 124 may be updated in the field when detector 110 communicates with another system that includes a more accurate or more frequently updated clock. For example, the time of real-time clock 124 may be updated to match the time of a body-worn camera when detector 110 communicates with the body-worn camera. In another example, the time of real-time clock 124 may be updated to match the time of a handheld device (e.g., cell phone, smart phone) when detector 110 communicates with the handheld device.

Processing circuit 112 may store information regarding the operation and status of detector 110. As discussed above, stored information may be referred to as a log. Information that is logged may be stored in memory 114. Log information may be retrieved. Communication circuit 122 may transmit log information to another electronic device, such as a server. Log information may be used to analyze the performance and operation of detector 110. Log information may be used to detect faults in the operation of detector 110. Information stored in a log may include events such as removal of firearm 142 from holster 150, insertion of firearm 142 into holster 150, activation of mute operation (e.g., mute mode), deactivation of mute operation, reset of detector 110, setting of time of real-time clock 124, a change in configuration of detector 110, receiving and/or installing a software upgrade, reverting to an earlier version of software, occurrence of a system fault either hardware or software, transmission of a message by communication circuit 122, receipt of a message by communication circuit 122, battery energy level, report of battery energy level, battery change, magnitude of inductance and/or impedance when firearm 142 is proximate, magnitude of inductance and/or impedance when firearm 142 is not proximate, receipt of user identity, successful authentication, unsuccessful authentication, state of operation, and/or receipt of serial number of firearm 142.

Information stored in a log may be referred to as an entry. A single type of information and/or information related to a single event or occurrence may be stored in an entry. Each entry may include a time-stamp of when the entry was recorded. Real-time clock 124 may provide the time-stamp. The time-stamp may include time, day, and/or date as discussed above.

Authentication circuit 126 may store keys used for encryption. Authentication circuit 126 may encrypt and/or decrypt data. Authentication circuit 126 may receive data from communication circuit 122 for decrypting. Authentication circuit 126 may provide encrypted data to communication circuit 122 for transmission. Authentication circuit 126 may cryptographically sign data prior to transmission.

Authentication circuit 126 may provide information for authenticating (e.g., confirming) the identity of detector 110. Authentication circuit 126 may request information for authenticating the identity of another system (e.g., server, recording system). A server may request that detector 110 authenticate its identity before the server communicates with detector 110. For example, a server may request that detector 110 authenticate its identity prior to providing detector 110 with sensitive data, such as a software update. Detector 110 may request that a server authenticate its identity prior to providing log entries to the server.

In an implementation of detector 110, referring to FIGS. 6-11, detector 610 includes front housing 810, screws 812, holes 960, circuitry 840, battery holder 820, battery 822, back housing 816, coil 830, shield 814, NFC tag 860, and shield 862. Front housing 810 may include user interface 850. User interface 850 may include indicator 854 (e.g., LED) and control 852 (e.g., user-operated switch). Back housing 816 may include coil cavity 832, and coil wall 834.

Circuitry 840 may include processing circuit 112, memory 114, communication circuit 122, real-time clock 124, authentication circuit 126, and sensor circuit 128. Battery holder 820 holds battery 822. Battery 822 provides power to operate circuitry 840, coil 830, indicator 854, and control 852. Screws 812 coupled front housing 810 to back housing 816 to enclose circuitry 840, battery holder 820, battery 822, coil 830, shield 814, NFC tag 860, and shield 862.

Shield 814 is positioned around a perimeter of PCB 210 and therefore around an edge of coil 830. Coil 830 is positioned in coil cavity 832 to position coil 830 proximate to coil wall 834. Shield 814 remains positioned around an edge of coil 830 while coil 830 is positioned in coil cavity 832. While detector 610 is in use with a holster, coil wall 834 is position proximate to holster 650 so that the electromagnetic waves from coil 830 pass through the wall of holster 650 to detect the presence or absence of metal. Detector 610 couples to positioner 612 to position coil wall 834 proximate to holster 650.

Sensor circuit 128 and/or a processing circuit of sensor circuit 128, or processing circuit 112, may include a temperature sensor. Information regarding temperature may be used to correct (e.g., adjust, compensate for) operation of sensor circuit 128 or other components that varies with temperature. For example, coil 200 may be formed on a PCB as discussed above. The electrical properties of coil 200 change over temperature. Further, when sensor circuit 128 is implemented using an LDC, the LDC receives a clock from an oscillator. The oscillator may be temperature sensitive thereby affecting the operation and measurements made by the LDC. A coil and an oscillator used as a clock may be characterized to determine how they vary over temperature. Processing circuit 112 may use the current temperature and the characterization data to adjust operation to compensate for temperature.

Near-field-communication ("NFC") tag 860 may communicate with a reader via wireless near-field communication. NFC tag 860 may be passive or active. NFC tag 860 may provide information to a reader. In an implementation, NFC tag 860 provides the serial number of detector 610 to the reader via NFC communication. NFC tag may operate independent of processing circuit 112, memory 114, communication circuit 122, user interface 116, sensor circuit 128, coil 130, real-time clock 124, and authentication circuit 126. Any device (e.g., smartphone, tablet, mobile computer, recharging station) may perform the function of an NFC reader. Shield 862 may shield NFC tag 860 from the electrical and electromagnetic noise produced by circuitry 840.

A user may operate control 852 to provide information to detector 610. A user may operate control 852 by pressing the releasing control 852. Pressing control 852 may provide a signal to processing circuit 112 as discussed above. Detector 610 may provide information to a user via indicator 854. Indicator 854 may provide information via illumination of a light. Indicator 854 may operate to provide a pattern of on-off flashes (e.g., blinks) of light to convey information. The pattern provided by indicator 854 may depend on the operating state of detector 610.

Processing circuit 112 may execute a program to perform the functions of an operating state. As discussed above, an operating state may be referred to as a mode of operation or simply a mode. In an implementation, the operating states of detector 110 and/or 610 may include sleep 1020, test 1030, field 1040, mute 1050, calibrate 1060, reset 1070, rollback 1080.

Processing circuit 112 may cooperate with or received signals from control 120/852 to exit or enter a state of operation. Processing circuit 112 may provide information to a user via indicator 120/854 upon entering or while operating in a state. Processing circuit 112 may use a timer or may measure an elapse of time using the time provided by real-time clock 124 to enter and/or leave a state of operation.

In state diagram of method 1000 of FIG. 10, sleep 1020 is a low power state in which most of the circuits of detector 160/610 are powered down to save battery power. In an implementation, the only circuitry that is active is the portion of processing circuit 112 that monitors control 118 to detect when control 118 has been pressed. Operation transitions into sleep 1020 from test 1030 after the expiration of a period of time. In an implementation, the period of time is 30 seconds. Operation moves from sleep 1020 to test 1030 responsive to activation of control 118. In an implementation, indicator 120/854 (e.g., LED) blinks three times with a green light to confirm the transition from sleep 1020 to test 1030.

In test 1030, the circuits of detector 160/610 are powered up so that a user may verify the proper operation of detector 160/610. In test 1030, a user may verify that detector 160/610 detects the insertion of firearm 142 into holster 150/650 and removal of firearm 142 from holster 150/650. When firearm 142 is inserted into holster 150/650, indicator 120/854 (e.g., LED) provides light that is visible to the user. When firearm 142 is removed from holster 150/650, indicator 120/854 ceases to provide light.

As stated above, operation stays in test 1030 for a duration of time before returning to sleep 1020. In an implementation, operation moves from test 1030 to sleep 1020 after a 30 second period of time. Thirty seconds is enough time for a user to insert and remove firearm 142 from holster 150/650 several times. If indicator 120 indicates proper detection of insertion and removal, a user may press control 118 to move operation from test 1030 to field 1040. In an implementation, control 118 must be pressed with a long press of 5 seconds or greater for operation to move from test 1030 to field 1040.

While in test 1030, if indicator 120/854 shows that detector 160/610 is not properly detecting the insertion and removal of firearm 142, a user may elect to calibrate detector 160/610. While in test 1030, a user may move into calibrate 1060 by pressing control 118 with a double press. In an implementation, a double press is one press on control 118, a pause, then a second press on control 118. The length of the pause may have an upper boundary.

In calibrate 1060, detector 110/610 determines the magnitude of the inductance or impedance that indicates that the weapon is in and/or out of the holster. In one implementation, detector 110/610 performs several readings of the inductance and/or impedance while the firearm 142 is withdrawn from holster 150/650. Detector 110/610 averages the value of the measured inductance and/or impedance to determine a base-line value of inductance and/or impedance. The base-line value is subtracted from readings performed in field 1040. A change from the base-line value, either more or less, indicates that firearm 142 is in holster 150/650.

In another implementation, detector 110/610 performs several readings while firearm 142 is in holster 150/650 and averages the values to create a base-line value for when firearm 142 is in holster 150/650. Detector 110/610 also performs several readings while firearm 142 is out of holster 150/650 and averages the values to create a base-line value for when firearm 142 is out of holster 150/650. While in the operating state field 1040, detector 110/610 uses the base-line values for firearm 142 being in and out of holster 150/650 to determine when firearm 142 is in or out of holster 150/650.

In an implementation, indicator 120/854 blinks three times with a green light after the double press on control 118 to confirm that operation has moved from test 1030 to calibrate 1060. Once calibration is complete, indicator 120/854 blinks three times with a green light to show the transition from calibrate 1060 back to test 1030.

While in operating state test 1030, a user may use control 118 to move from operating state test 1030 to operating state field 1040. A user may press control 118 with a long-press to initiate the change from test 1030 to field 1040. In an implementation, a long press is a press that is greater than 5 seconds, but less than 25 seconds. In an implementation, indicator 120/854 blinks 3 times with a green light to indicate the transition from test 1030 to field 1040.

In the operating state field 1040, detector 110/610 performs method 1100 to monitor the presence or absence of firearm 142 in holster 150/650. Method 1100 includes operating states wait 1102, activate 1104, measure 1106, present 1108, transmit 1110, and count 1112.

In wait 1102, detector 110/610 waits for a period of time. While in wait 1102, the circuits of detector 110/610 are in a low power state to save energy to prolong the life of the battery. At the end of the period of time, detector 110/610 transitions to operating state activate 1104.

In activate 1104, detector 110/610 activates the coil and measures inductance, impedance and/or frequency of oscillation to detect the presence or absence of firearm 142 in holster 150/650.

In another implementation, the Texas Instruments inductance-to-digital integrated circuit LCD1101 controls the operation of coil 130/200, measures the frequency, inductance, and/or impedance, and reports a digital value to processing circuit 112.

After activate 1104 has activated coil 130/200 and returns a value of the frequency of the LC tank circuit, the inductance of coil 130/200, and the impedance of coil 130/200 and/or LC tank circuit, operation moves to present 1108.

In operating state present 1108, detector 110/610 uses the information determined in activate 1104 to determine whether firearm 142 is present in holster 150/650 or whether firearm 142 is absent from holster 150/650. In an implementation, processing circuit 112 compares the value provided by the LDC1101 integrated circuit or the value of the measured frequency of the LC tank circuit, or the measured value of the inductance of the LC tank circuit to one or more base-line values to determine whether firearm 142 is in or out of holster 150/650. If firearm 142 is present in holster 150/650, execution of method 1100 moves to operating state wait 1102. If firearm 142 is not present in holster 150/650, execution moves to transmit 1110.

In transmit 1110, detector 110/610 transmits a message that contains some or all of the information discussed above including that firearm 142/642 has been removed from holster 150/650. Any recording system that receives the message may determine that the information provided by the message indicates that firearm 142/642 has been removed from holster 150/650. A recording system may (e.g., permissive trigger) start to capture and/or record information responsive to such information in the message. After transmitting the message, execution moves to operating state count 1112.

In operating state count 1112, detector 110/610 determines whether the message has been transmitted a certain number of times. In an implementation, the message is transmitted once per second for 30 seconds. If the message has been transmitted the predetermined number of times, execution moves to operating state wait 1102. If the message has not been transmitted the predetermined number of times, execution returns to operating state transmit 1110.

During the time that detector 110/610 remains in field 1040, indicator 120/854 may be shut off to conserve energy and to not blink when dark thereby disclosing the position of the user.

In the event that a user wishes to remove firearm 142 from holster 150/650 without requesting that any cameras or other recording devices start recording, the user may put detector 110/610 in the mute 1050 operating state. For example, an officer may need to remove firearm 142 from holster 150/650 temporarily upon entering a court house. A user may request a transition from field 1040 to mute 1050 by pressing control 120/852 with a long press.

Detector 110/610 remains in the mute mode for a period of time (e.g., 30 seconds). At the expiration of the period of time, operation returns to field 1040. While in mute 1050, detector 110/610 performs method 1100; however, irrespective of whether firearm 142 is in or out of holster 150/650, the transmitted messages include a mute bit whose value is set to a one. Setting the mute bit to a one indicates that the user as requested the mute mode and the state of operation is presently in mute 1050. Cameras or other recording devices ignore messages that include a mute bit with the value set to a one. Operation remains in mute 1050 for the predetermined amount of time, thereby possibly repeatedly executing method 1100 several times.

While in mute 1050, indicator 120/854 blinks to indicate that operation is in mute 1050. However, additional information may be provided by indicator 120/854 while in mute 1050. For example, indicator 120/854 blinks with a red color if the battery is low and with a green color if the battery level is not low (e.g., above a pre-determined level).

At any time and from any state of operation, a user may press control 120/852 for an extended long press (e.g., 25 seconds) to transition from whatever the present state of operation is (e.g., sleep 1020, test 1030, calibrate 1060, field 1040, mute 1050) to reset 1070 operating set. Indicator 120/854 confirms the transition to reset 1070 by blinking with a blue color.

While in reset 1070, detector 110/610 performs operations to reset all components of indicator 120/854 to a known state. After setting all components to a known state, detector 110/610 restarts operation and enters operating state test 1030.

At any time and from any state of operation, a user may press control 120/852 for an even longer extended long press (e.g., 40 seconds) to transition from whatever the present state of operation is to rollback 1080 operating set. Indicator 120/854 confirms the transition to rollback 1080 by alternately blinking with a blue and green color.

While in rollback 1080, detector 110/610 selects for execution a previous version of software. Processing circuit 112 executes a stored program (e.g., software, firmware) stored in memory 114 to perform the functions of detector 110/610. The stored program may be updated by receiving new software via wired or wireless communication. Detector 110/610 may wirelessly communicate with a hand-held device (e.g., smartphone, tablet) or a server to receive updated software. Detector 110/610 may store two or more version of software including the factory version loaded into detector 110/610 at manufacture. In the event that the present version of software does not operate properly (e.g., bug, corruption of memory 114), a user may activate operating state rollback 1080 to return to a prior version of the software.

Once the prior version of the software has been selected as the present version of software, operation moves to reset 1070 to reset operation executing the different version of software.

In an implementation, field 1040 may perform a further method, in addition to method 1100, to periodically transmit a status message that is different and separate from the message transmitted in transmit 1110. A status message may include information regarding the status of detector 110/610. A status message may exclude information regarding the status of firearm 142/642 (e.g., withdrawn, inserted). In an implementation, the status message is transmitted every 40 seconds. The status message includes information regarding the status of the battery (e.g., charge level).

Other implementations include the implementations provided below.

A system for positioning a detector to detect removal of a provided firearm from a provided holster, the holster includes a mount and a belt mount, the mount coupled to the holster, the mount configured to couple to the belt mount, the system comprising: a plate; the detector; and a positioner, the positioner configured to couple to the detector and to the plate; wherein the plate is configured to be positioned between the mount and the belt mount prior to coupling the mount to the belt mount; coupling the mount to the belt mount retains the plate between the holster and the belt mount; coupling the positioner to the detector and to the plate while the plate is retained between the mount and the belt mount positions the detector proximate to a wall of the holster; and while the detector is proximate to the wall of the holster, an electromagnetic field of the detector passes through the wall to detect removal of the firearm from the holster.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A system for detecting a presence of a weapon in a holster and an absence of the weapon from the holster, the system comprising:
    a mount comprising a tape, wherein the tape provides an adhering force between the mount and the holster;
    a detector that couples to the mount, the detector comprising a sensor circuit, a coil, a first communication circuit, a memory, and a processing circuit communicatively coupled to the sensor circuit, the first communication circuit, and the memory, wherein the sensor circuit cooperates with the coil to detect the presence of the weapon in the holster and the absence of the weapon from the holster, and wherein the processing circuit is configured to perform operations comprising:
        determining the presence of the weapon in the holster using a value of a first magnitude detected by the sensor circuit when metal from the weapon is proximate the coil;
        determining the absence of the weapon from the holster using a value of a second magnitude detected by the sensor circuit when the metal from the weapon is not proximate the coil;
        while in a field mode, and responsive to determining the absence of the weapon from the holster using the value of the second magnitude detected by the sensor circuit, transmitting a first message via the first communication circuit, wherein the first message includes at least one of a group comprising a unique identifier of the detector, a state of operation of the detector, or an identity of a user of the system;
        while in a test mode, and responsive to determining the presence of the weapon in the holster using the value of the first magnitude detected by the sensor circuit, transmitting first information via the first communication circuit; and
        while in the test mode, and responsive to determining the absence of the weapon from the holster using the value of the second magnitude detected by the sensor circuit, transmitting second information via the first communication circuit; and
    a smart phone comprising a second communication circuit and a touch screen, wherein:

a user interface for the detector is implemented by the smart phone;
the user interface comprises an indicator and a control;
responsive to receiving the first information via the second communication circuit, the presence of the weapon is indicted via the indicator;
responsive to receiving the second information via the second communication circuit, the absence of the weapon is indicated via the indicator;
responsive to a first operation of the control, a third information is communicated to the detector via the second communication circuit; and
the control includes a portion of the touch screen, wherein the operations performed by the processing circuit of the detector further comprise, responsive to receiving the third information via the first communication circuit, entering a calibrate mode.

2. The system of claim 1, wherein the tape comprises a very high bond tape and the mount comprises a very high bond mount.

3. The system of claim 1, wherein the user interface comprises a second control and, responsive to a second operation of the second control, components of the indicator are reset to a known state and the test mode is entered.

4. The system of claim 1, wherein:
the first magnitude comprises a first magnitude of inductance, impedance, and/or frequency; and
the second magnitude comprises a second magnitude of inductance, impedance, and/or frequency.

5. The system of claim 1, wherein the operations further comprise, while in the field mode and responsive to determining the presence of the weapon in the holster using the value of the first magnitude, transmitting a second message via the first communication circuit.

6. The system of claim 5, further comprise a recording device configured to receive the second message and, upon receiving the second message, continue recording.

7. The system of claim 1, further comprising a body-worn camera configured to receive the first message and initiate recording responsive to the first message.

8. The system of claim 7, wherein:
the first message includes the unique identifier of the detector; and
the recording is initiated responsive to the unique identifier matching a list of permitted detectors.

9. The system of claim 1, wherein the operations comprise:
while in the calibrate calibration mode, determining a third magnitude of impedance or inductance detected by the sensor circuit that indicates the presence of the weapon in the holster and/or the absence of the weapon from the holster.

10. The system of claim 9, wherein the operations further comprise:
while in the calibrate mode, performing several readings of the third magnitude of impedance or inductance detected by the sensor circuit.

11. The system of claim 10, wherein the operations further comprise:
while in the calibrate mode, averaging the several readings to create a base-line value.

12. The system of claim 11, wherein determining the presence of the weapon in the holster using the value of the first magnitude detected by the sensor circuit comprises:
comparing the value of the first magnitude to the base-line value to determine the value of the first magnitude indicates the weapon is inserted in the holster.

13. The system of claim 11, wherein determining the absence of the weapon from the holster using the value of the second magnitude detected by the sensor circuit comprises:
comparing the value of the second magnitude to the base-line value to determine the value of the second magnitude indicates the weapon is withdrawn from the holster.

14. A method for detecting a presence of a weapon in a holster and an absence of the weapon from the holster, the method comprising:
coupling, via a mount comprising a tape, a detector to the holster;
detecting, by a sensor circuit of the detector, a value of a first magnitude when metal from the weapon is proximate a coil of the detector;
detecting, by the sensor circuit, a value of a second magnitude when the metal from the weapon is not proximate the coil of the detector;
determining, by a processing circuit of the detector, the presence of the weapon in the holster using the value of the first magnitude detected by the sensor circuit;
determining, by the processing circuit, the absence of the weapon from the holster using the value of the second magnitude detected by the sensor circuit;
while in a field mode of the detector, and responsive to determining the absence of the weapon from the holster, wirelessly transmitting a first message via a first communication circuit of the detector, wherein the first message includes at least one of a group comprising a unique identifier of the detector, a state of operation of the detector, or an identity of a user of the detector;
while in a test mode of the detector, and responsive to determining the presence of the weapon in the holster, transmitting first information via the first communication circuit;
while in the test mode, and responsive to determining the absence of the weapon from the holster, transmitting second information via the first communication circuit;
responsive to receiving the first information via a second communication circuit of a smart phone, indicating, via an indicator of a user interface of the smart phone, the presence of the weapon in the holster, wherein the indicator comprises a touch screen of the smart phone;
responsive to receiving the second information via the second communication circuit, indicating, via the indicator, the absence of the weapon from the holster;
responsive to a first operation of a first control of the user interface, communicating a third information to the detector via the second communication circuit, wherein the control comprises a portion of the touch screen; and
responsive to receiving the third information via the first communication circuit, entering, by the processing circuit, a calibrate mode.

15. The method of claim 14, wherein the user interface comprises a second control and the method further comprises, responsive to a second operation of the second control, resetting components of the indicator to a known state.

16. The method of claim 14, wherein:
the first magnitude comprises a first magnitude of inductance, impedance, and/or frequency; and
the second magnitude comprises a second magnitude of inductance, impedance, and/or frequency.

17. The method of claim 14, wherein the operations comprise:

while in the calibrate mode, determining, by the processing circuit, a third magnitude of impedance or inductance detected by the sensor circuit that indicates the presence of the weapon in the holster and/or the absence of the weapon from the holster.

18. The method of claim 17, further comprising:
while in the calibrate mode, performing, by the processing circuit, several readings of the third magnitude via the sensor circuit.

19. The method of claim 14, wherein:
indicating the presence of the weapon in the holster comprises providing, via the indicator, light that is visible to the user; and
indicating the absence of the weapon from the holster comprises ceasing, via the indicator, providing the light.

20. A system for detecting a presence of a weapon in a holster and an absence of the weapon from the holster, the system comprising:
- a detector comprising a sensor circuit, a coil, a first communication circuit, a memory, and a processing circuit communicatively coupled to the sensor circuit, the first communication circuit, and the memory, wherein the sensor circuit cooperates with the coil to detect the presence of the weapon in the holster and the absence of the weapon from the holster, and wherein the processing circuit is configured to perform operations comprising:
  - determining the presence of the weapon in the holster using a value of a first magnitude detected by the sensor circuit when metal from the weapon is proximate the coil;
  - determining the absence of the weapon from the holster using a value of a second magnitude detected by the sensor circuit when the metal from the weapon is not proximate the coil;
  - while in a field mode, and responsive to determining the absence of the weapon from the holster, wirelessly transmitting a trigger via the first communication circuit, wherein the trigger includes at least one of a group comprising a unique identifier of the detector, a state of operation of the detector, or an identity of a user of the system;
  - while in a test mode, and responsive to determining the presence of the weapon in the holster, communicating first information via the first communication circuit; and
  - while in the test mode, and responsive to determining the absence of the weapon from the holster, communicating second information via the first communication circuit;
- a mount comprising a very high bond tape, wherein the very high bond tape adheres the mount to the holster and the mount positions the detector with respect to the holster; and
- a user interface for the detector, wherein:
  - the user interface is implemented by an electronic device that includes a touch screen;
  - responsive to the first information being received by a second communication circuit of the electronic device, the user interface provides the first information visually via the touch screen to indicate the presence of the weapon in the holster;
  - responsive to the second information being received by the second communication circuit, the user interface provides the second information visually via the touch screen to indicate the absence of the weapon from the holster; and
  - responsive to operation of a control of the user interface, a third information is communicated to the detector, wherein the operation occurs by a selection of a portion of the touch screen, and wherein the operations performed by the processing circuit of the detector further comprise, responsive to receiving the third information via the first communication circuit, entering a calibrate mode.

* * * * *